United States Patent
Daoud et al.

(10) Patent No.: US 6,487,357 B1
(45) Date of Patent: Nov. 26, 2002

(54) STRAIN RELIEF DEVICE WITH BEND LIMITER AND SLACK STORAGE

(75) Inventors: Bassel H. Daoud, Parsippany, NJ (US); David S. Kerr, Morris Plains, NJ (US); Ivan Pawlenko, Holland, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/871,093

(22) Filed: May 31, 2001

(51) Int. Cl.⁷ ................................................. G02B 6/44
(52) U.S. Cl. ...................................... 385/135; 385/136
(58) Field of Search ............................... 385/135–136, 385/138; B65H 75/48

(56) References Cited

U.S. PATENT DOCUMENTS

| | | | | |
|---|---|---|---|---|
| 4,648,168 A | * | 3/1987 | Nolf et al. ..................... | 29/447 |
| 4,717,231 A | * | 1/1988 | Dewez et al. ................ | 385/134 |
| 5,013,121 A | * | 5/1991 | Anton et al. ................. | 385/135 |
| 5,323,481 A | * | 6/1994 | Tokumaru et al. .......... | 385/136 |
| 5,668,910 A | * | 9/1997 | Arnett ........................ | 361/826 |
| 6,275,639 B1 | * | 8/2001 | Bolt et al. .................. | 385/134 |

FOREIGN PATENT DOCUMENTS

JP      361047906 A   *   3/1986   ................. 385/135

* cited by examiner

*Primary Examiner*—Robert H. Kim
*Assistant Examiner*—Krystyna Suchecki
(74) *Attorney, Agent, or Firm*—Woodbridge & Associates, PC

(57) ABSTRACT

A fiber strain relief apparatus is disclosed with bend radius limiter and slack storage. The strain relief mechanism is a bend limiter drum with three lugs, a strain relief pivoting top with latch, a latch stopper handle, a compressible gasket, and a base with latch. Fiber slack is wound around the bend limiter drum. Fibers are prevented from sliding off by the lugs. A gasket compresses on to the fibers producing a strain relief action, while the slack is being stored on the drum. Unlatching the strain relief top is performed by compressing the top latch against the latch stopper. The strain relief top pivots around a living hinge producing access to the drum. Cable is coiled around the drum and the strain relief top is latched, holding the fiber against the drum. A base latch is provided allowing the device to be mounted and removed from a panel.

8 Claims, 2 Drawing Sheets

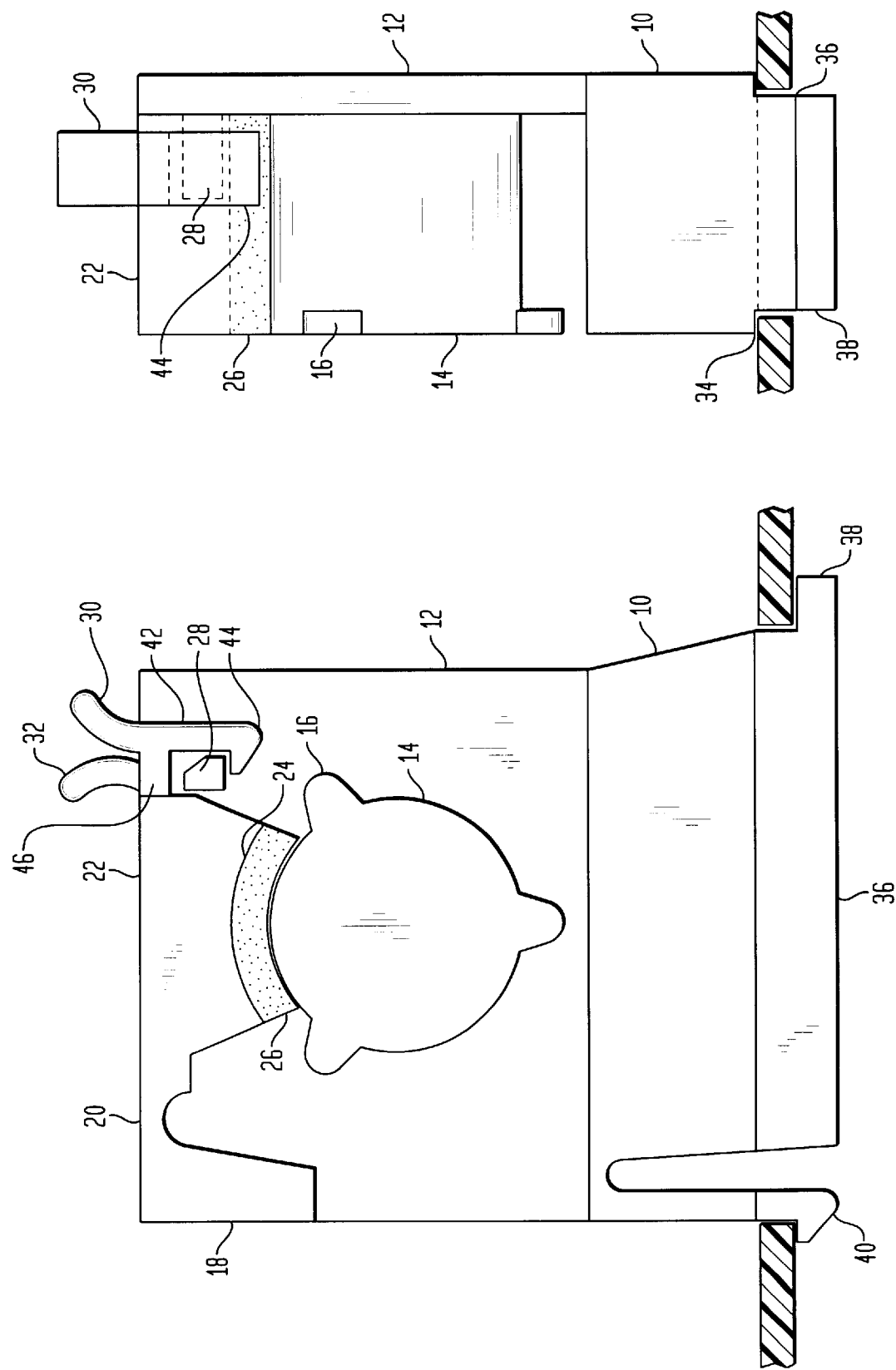

STRAIN RELIEF DEVICE WITH BEND LIMITER AND SLACK STORAGE

BACKGROUND OF THE INVENTION

1. Field of the Invention

This invention relates to a device for providing strain relief for fiber optic cable, which also provides slack storage for a length of fiber optic cable without exceeding the minimum bend radius for the cable.

2. Description of Related Art

The slack for Optical Fibers that are connected to interconnection and cross connection enclosures currently is stored in long loops that are draped inside the enclosures and do not have a strain relief mechanism to limit the mechanical strain on the fiber or a bend limiter that can control the bend radius of the fiber while the fiber is being pulled during a tracing process. If the fiber is attached to a connector or a splice, the pulling action on the fiber can produce excessive damage to the fiber at the interface location between the fiber and the connector or splice. Therefore, it is desirable to have a separate strain relief mechanism that forces the fiber into maintaining a minimum bend radius.

SUMMARY OF THE INVENTION

Briefly described, the invention comprises a fiber optic cable strain relief apparatus with a bend radius limiter and slack storage. The strain relief mechanism consists of a bend limiter drum with three lugs, a pivoting strain relief top with latch, a latch stopper handle, a compressible foam gasket, and a removable base with latch. The bend limiter drum stores fiber slack around it. The retainer lugs are mounted at the end of the drum to prevent the fibers which are wound around the drum from sliding off. The compressible gasket compresses on to the fibers to hold them secure and produce a strain relief action, while the fiber slack is being stored on the drum. To install the fibers on the drum, the strain relief top is unlatched by compressing the top latch against the latch stopper. The strain relief top can then pivot around a living hinge producing a clear access to the drum. The fiber optic cable is coiled around the bend limiter drum and the strain relief top is latched in place, holding the fiber securely against the drum. The strain relief mechanism is equipped with a base latch that allows it to be mounted and removed from a mounting surface. The surface must have a cut out to accept the base.

The invention may be more fully understood by reference to the following drawings.

BRIEF DESCRIPTION OF THE SEVERAL VIEWS OF THE INVENTION

FIG. 1 illustrates a front view of the strain relief device with bend limiter and slack storage.

FIG. 2 illustrates a side view of the strain relief device with bend limiter and slack storage.

DETAILED DESCRIPTION OF THE INVENTION

Figure 3:
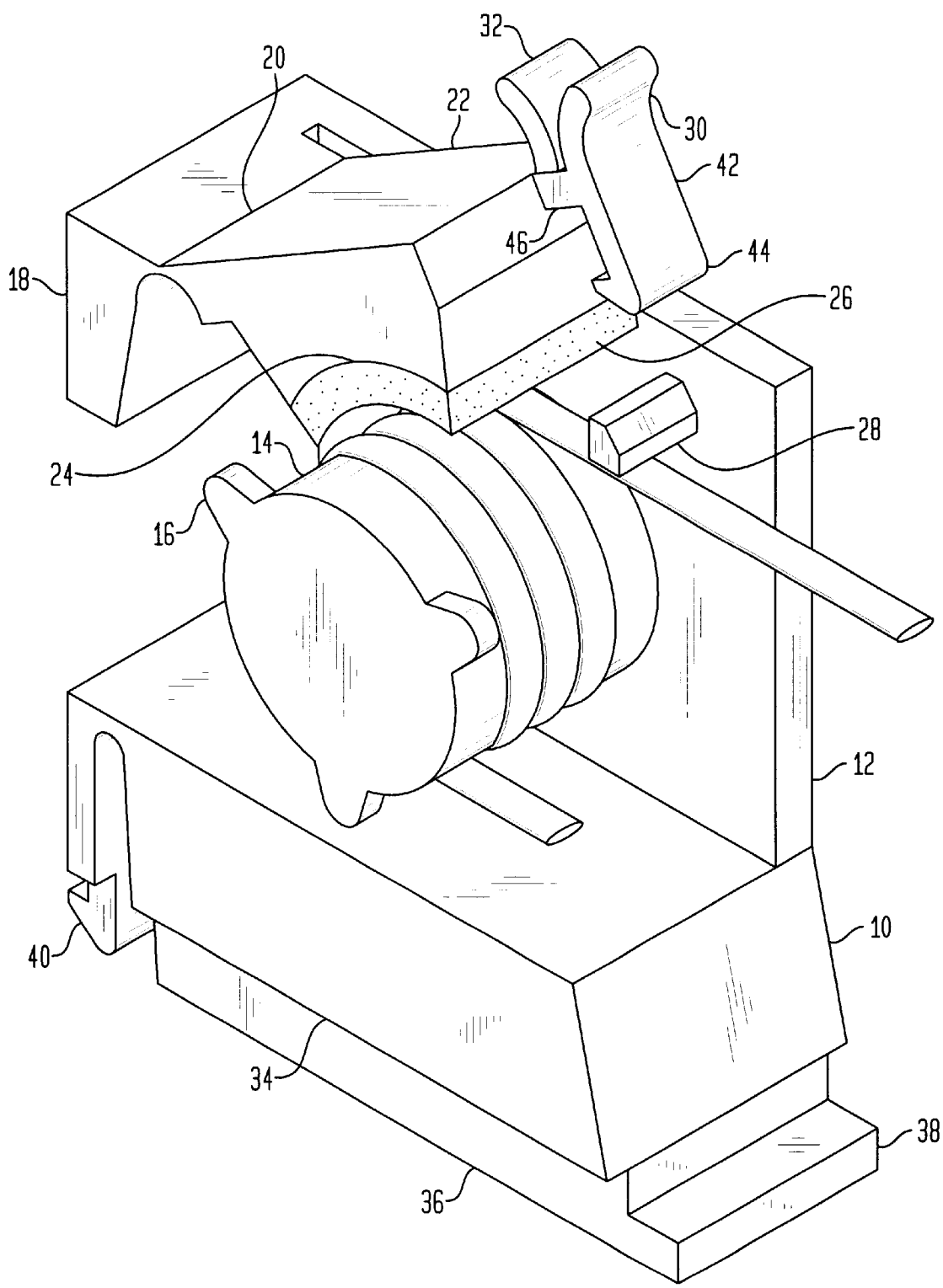
FIG. 3 illustrates a perspective view of the strain relief device with bend limiter and slack storage showing the strain relief top in the open position and the fiber optic cable wound around the bend limiter drum.

During the course of this description like numbers will be used to identify the like elements according to the different views, which illustrate the invention.

The preferred embodiment of the invention consists of a rectangular base 10. A plate 12 is mounted on its edge to the top side of the base. A bend limiter drum 14 is mounted on one side of the plate. At least two but preferably three lugs 16 are mounted on the free end of the bend limiter drum to keep the fiber from sliding off of the drum. A post 18 is mounted to one corner of the plate to provide a mounting point for a living hinge 20. The opposite end of the living hinge is connected to one end of the strain relief top 22. The strain relief top 22 is constructed so that the side opposite the bend limiter drum 24 is contoured to parallel the curve of the bend limiter drum 14. A compressible gasket 26 made of rubber or some other compressible material is attached to the curved side of the strain relief top 22. The strain relief top 22 is positioned so that when it is latched, the contoured side of the strain relief top 22 holds the gasket 26 in contact with the bend limiter drum 14 to firmly hold the cable against the drum. The end of the strain relief top 22 which is opposite the living hinge 20 is attached to a latching mechanism to hold the strain relief top 22 against the bend limiter drum 14. The latching mechanism consists of a lever 42 with a latch handle 30 and a latch hook 44, and is connected by a living hinge 46 to the free end of the strain limiter top 22. When the strain relief top 22 is rotated around the living hinge 20 and makes contact with the bend limiter drum 14, the latch hook 44 hooks around a second post 28 attached to the plate 12. To release the latch on the strain relief top 22, the latch handle 30 is compressed against the latch stopper 32 by simultaneously squeezing the latch handle 30 and the latch stopper 32 between two fingers.

The entire device is mounted in a panel, which has cut out to accept the base 10. Two sides of the bottom of the base 10 have a shoulder 34, which rests on the top of the panel. The bottom of the base has an extension 36, which fits into and projects behind the panel. There is a foot 38 on one end of the base, which extends beyond the end of the base and hooks on to the underside side of the panel. There is a hook 40, attached to the base on the end opposite the foot. The neck of the hook is flexible to allow the hook 40 to flex so that the extension of the base 36 can be inserted into the cut out in the panel. Once in place the hook 40 springs back to its unflexed position and catches on the underside of the plate.

To operate the device, the strain relief top 22 is unlatched and lifted away from the bend limiter drum 14. The slack fiber optic cable to be stored on the device is wound around the bend limiter drum 14 and held on the drum by the lugs 16. The strain relief top 22 is latched against the bend limiter drum 14, and the compressible gasket 26 compresses onto the fibers wound around the bend limiter drum 14, producing a strain relief action in the fiber while it is stored on the drum. The bend limiter drum 14 is dimensioned so that the radius of the drum is not less than the minimum bend radius allowed for the fiber optic cable.

While the invention has been described with reference to the preferred embodiment thereof, it will be appreciated by those of ordinary skill in the art that modifications can be made to the structure and elements of the invention without departing form the spirit and scope of the invention as a whole.

We claim:

1. A strain relieving and bend limiting apparatus for optical fibers and providing slack storage therein, said apparatus comprising:

(a) a base having a bottom surface and a top surface;

(b) a plate with a first edge and a second edge attached to said top surface of said base at said first edge;

(c) a strain relief drum with a given radius attached at one end to said plate;

(d) a first post attached to a corner of said plate;

(e) a strain relief top with a first end and a second end and with a contoured side and a flat side, the contoured side of said strain relief top is curved to parallel the curve on said strain relief drum; and, (f) a hinge means for connecting said first end of said strain relief top with said post together in a hinged manner so that said second end of said strain relief top can rotate about said hinge means from an open position to a closed position so as to be held against said strain relief drum, wherein said strain relief top can move from said open position to said closed position to hold said optical fibers on said strain relief drum.

2. The apparatus of claim 1 wherein said base includes a mounting means for mounting said bottom surface of said base on a panel said mounting means comprising:

(a) an extension of said bottom of said base with a depth sized to allow the extension to protrude below said panel through an opening in said panel;

(b) a shoulder on two opposing sides of said bottom of said base so that said base can rest on said panel;

(c) a foot which extends below the surface of said panel and outward from said bottom of said base parallel to said bottom of said base to engage the underside of said panel; and, (d) a hook means opposite said foot to engage the underside of said panel and hold said shoulder of said base against said panel.

3. The apparatus of claim 2 wherein said strain relief drum is cylindrical and said given radius of said strain relief drum is at least 1½ inches.

4. The apparatus of claim 3 further including at least two lugs attached to the end of said strain relief drum opposite to the plate.

5. The apparatus of claim 4 further including:

a gap between said contoured side of said strain relief top and said strain relief drum to form a gasket space; and, a compressible gasket attached to said contoured side of said strain relief top in said gasket space.

6. The apparatus of claim 5 wherein said hinge means is a living hinge.

7. The apparatus of claim 6 further including a latching means connected to said second end of said strain relief top for holding said strain relief top against said strain relief drum; said latching means comprising:

(a) a second post attached to said plate;

(b) a lever with a hook end and a handle end;

(c) a latch stopper attached to said second edge of said strain relief top near said handle end of said lever so that said handle end of said lever can be compressed against said latch stopper; and, (d) a hinge means connected to said second end of said strain relief top and the mid point of said lever so that said lever can rotate around said hinge and said hook end can engage with said second post.

8. The apparatus of claim 7 wherein said hinge means is a living hinge.

* * * * *